United States Patent Office 3,560,222
Patented Feb. 2, 1971

3,560,222
METHOD OF RAPIDLY DEVELOPING AND STABILIZING THE CURED COLOR IN COMMINUTED MEAT AND COMPOSITION THEREFOR
William E. Delaney, Chicago, Ill., assignor to Kadison Laboratories, Inc., Chicago, Ill.
No Drawing. Continuation-in-part of application Ser. No. 500,231, Oct. 21, 1965. This application Sept. 4, 1969, Ser. No. 855,365
Int. Cl. A22c *11/00;* A23b *1/03*
U.S. Cl. 99—108
9 Claims

ABSTRACT OF THE DISCLOSURE

A composition, and method of using same, for effecting the rapid development and stabilization of the cured color in comminuted meat products which comprises a solid, substantially water-insoluble, heat-rupturable body of a size not appreciably greater than the particulate material of a comminuted meat mass or emulsion, said body consisting essentially of a substantially inert vehicle exemplified by ethyl cellulose and certain food grade acids exemplified by citric acid. The acid is insulated from the meat mass by the inert vehicle and is released into said mass upon rupture thereof by heat whereby a change in pH of the meat mass is brought about, and the rapid development and stabilization of the cured meat color is achieved. In one form of the composition, the acid insulating vehicle comprises an inert, water-soluble substance for initially entrapping the acid particles, and an inert, substantially water-insoluble, heat rupturable substance for insulating the entrapped particles from the meat mass.

This application is a continuation-in-part application of U.S. Ser. No. 500,231, filed Oct. 21, 1965, now abandoned.

The present invention relates to compositions having utility in the processing of comminuted meat products and, in particular, relates to compositions in a unique form which, when incorporated into meat emulsions of the type utilized in manufacturing meat products such as sausages, will accelerate the development of the desired cured color and the stabilization and permanence thereof in the finished meat products.

The treatment of meat emulsions to influence the development and/or permanence of the characteristic red color in the finished comminuted meat product has been accorded intensive study. Numerous investigations in this connection have sought to eliminate the long holding periods normally required for developing the desired cured color. As an outgrowth of such investigations, various procedures have been evolved which, while reasonably effective for the indicated purpose, still have a number of shortcomings, particularly in regard to the necessity for strict controls of various aspects of such procedures.

In accordance with the present invention, compositions are provided which enable a meat processor readily to control with precision and exactitude the development and fixation of the desired cured color in manufactured meat products. The "guess work," so to speak, which characterized prior art practices is substantially eliminated. This result is attained without the necessity for altering normal meat processing procedures, and advantageously is achieved at the final stages of the processing procedure, after the critical conditions for proper emulsification have been established and emulsification has been completed.

Briefly, the compositions of the present invention take the form of solid, substantially water-insoluble, heat rupturable bodies or pellets of a size not appreciably greater than the particulate material of a comminuted meat mass or emulsion to which they are added. The bodies or pellets consist essentially of a substantially inert vehicle and certain food grade acids, as set forth in greater detail hereinafter. The inert vehicle acts to insulate the acid from the meat mass whereby the acid embodied, encased, or incorporated therein will only be released into the meat mass at a preselected optimum stage in the processing procedure irrespective of the conditions, both physical and chemical, existing in the meat mass prior to the time it reaches that stage. The acid is controllably releasable into the meat mass by subjecting the meat mass to a temperature sufficient, among other things, to rupture the inert vehicle coating. The thusly released acid effects a change in the pH of the meat mass thereby to promote the rapid development and stabilization of the cured meat color in the meat mass. In one form of the compositions of this invention, the inert vehicle comprises an inert, water-soluble substance for initially entrapping the acid particles or crystals, and an inert substantially water-insoluble, or difficultly water-soluble, heat rupturable substance for insulating the entrapped particles or crystals from the meat mass.

The food grade acids having utility for the purposes of the present invention are normally in solid or crystalline form, water-soluble and are selected from the group consisting of citric acid, tartaric acid, ascorbic acid, isoascorbic acid and adipic acid, and compatible mixtures thereof.

The vehicle utilized for the acid should be one which is characterized by being capable of resisting attack by the food-acid, the water in the meat mass or emulsion, and the curing chemicals normally present therein. In addition, the vehicle should be capable of breakdown, as by melting, at the elevated temperatures normally utilized in forming finished comminuted meat products, and should be harmless and, desirably, digestible. It should, furthermore, not appreciably alter the texture or taste properties of the finished meat product. Typical examples of vehicles having utility for this purpose are ethyl celluloses, microcrystalline cellulose, keratin, agar-agar, stearic acid, cellulose phthalate, and the like. Particularly satisfactory results are attainable with ethyl cellulose products sold under various N-grade designations, and those sold under the trade designation "Ethocel." In order to provide a vehicle which will melt, and thereby release the contained acid, at the temperatures normally used in treating comminuted meat products, it may be necessary, in certain instances, to incorporate either lower, or higher, melting point agents in the principal vehicle. Thus, for example, in utilizing a relatively high melting point ethyl cellulose of the N-grade type, having an ethoxy group content of from about 45.5% to about 48.5%, as the vehicle, it has been found advantageous to admix the ethyl cellulose with a lower melting point agent such as a polyethylene glycol. The polyethylene glycol products sold under the trademark "Carbowax" are especially suitable for this purpose. Waxes, exemplified by beeswax, spermaceti, and the like, also can be used to alter the melting point of the principal vehicle.

The vehicle may be applied to the acid in accordance with any one or more known practices such as mixing, panning, spray drying, or the like. In applying the vehicle to the acid, a sufficient quantity should be used to attain substantially complete envelopment or coverage of the acid particles or crystals and yet remain within the dimensional characteristics and vehicle-to-acid weight ratios desired in the final solid body or pellet. Thus, to achieve this objective, it is advantageous, when utilizing a vehicle such as an ethyl cellulose, for example, to initially impregnate the acid particles or crystals in the vehicle by admixing them in a high speed planetary mixer, for example, to at least partly entrap and encase the acid crystals in the vehicle, and to thereafter apply a thin protective coating to the pellets thus formed to substantially completely cover any exposed acid crystal areas present in the initially formed pellets. This two-step operation has the further important advantage of enabling the utilization of water-soluble vehicles including gums such as gum arabic, cebil gum, and the like; inert salts exemplified by sodium caseinate, or the like; gelatin, sugars, confectioners glaze, and the like; to initially entrap or impregnate the acid crystals. A second, water-insoluble, or difficultly water-soluble, but heat-rupturable, vehicle, as described above, can then be applied to obtain pellets having the characteristics called for. In such instances, the water-soluble substance can comprise from about 10% to about 70%, especially desirably from about 20% to about 40%, by weight, of the total weight of the coating on the acid particles or crystals.

The proportions of vehicle-to-acid comprising the pelletized compositions of the present invention can be varied. Generally speaking, it is advantageous to utilize pellets wherein the acid constitutes, by weight, from about 1% to about 25%, usually about 5% to 20%, of the total weight of the pellet.

The dimensions of the pellets likewise are variable. The pellets, however, must be of a size such that they do not unduly interfere with the initial processing of the meat mass or emulsion or the final emulsification thereof. It is also important that the pellets be of a size such that they can be uniformly and intimately distributed throughout the emulsion so that, when the acid component of the pellets is released, substantial portions of the emulsion will come into contact with the acid thereby enabling the acid to effect the desired lowering of the pH of the emulsion and the concomitant rapid development of the cured color and the stabilization of the color. In accordance with the present invention, it has been found that these conditions are well satisfied with pellets having a mesh size ranging from 20 to 50, especially desirably from 30 to 40. The configuration of the pellets is subject to wide variation and is not critical to the attainment of the objectives of this invention. Generally speaking, the pellets will be in the form of spheres or cylinders, depending upon the particular pelletizing procedure employed.

The quantity of the acid-containing pellets added to a meat mass forming the emulsion should be sufficient to provide a concentration of the acid in the emulsion of from about 1% to 5%, usually from 2% to 4%, for every 100 pounds of meat present. The pellets can be introduced into a comminuted meat mass either prior to emulsification or at any stage during emulsification, the only condition to be satisfied in this regard being that provision be made for distributing the pellets relatively uniformly throughout the meat mass or emulsion at some stage prior to applying heat to the emulsion to coagulate the proteins and to set the texture of the emulsion. A convenient stage at which to introduce the pellets of this invention into the meat mass is at the chopper or mixer stage.

The following examples are illustrative of the practice of the present invention. It will be understood, however, that various modifications thereof can readily be evolved in view of the guiding principles and teachings provided herein.

EXAMPLE 1

In the bowl of a Century 20 quart mixer 500 grams of a mixture comprising four parts of an N-grade ethyl cellulose, having an ethoxy group content of 45.5%, and one part polyethylene glycol ("Carbowax") are admixed with 137 grams of crystalline citric acid monohydrate (125 grams citric acid) and 750 grams of deionized water. A homogeneous mass is formed after several minutes at mixing speed 1. The mass is then transferred to a spray dryer and passed therethrough, employing a pressure-nozzle atomization, under the following conditions:

| | |
|---|---|
| Pump pressure (p.s.i.g.) | 3000 |
| Feed rate (g.p.h.) | 100 |
| Air rate (s.c.f.m.) | 4000 |
| Inlet temperature, ° F. | 200 |
| Outlet temperature, ° F. | 120 |
| Conveying temperature, ° F. | 150 |
| Retention time, seconds | 20 |

The dry weight of the spheres consists of 80 parts of the ethyl cellulose-polyethylene glycol mixture and 20 parts of citric acid. The sphere size ranges between 20 and 30 mesh.

A meat composition to be emulsified is made up as follows:

Beef—65 lbs.
Veal—10 lbs.
Pork trimmings (lean)—5 lbs.
Pork trimmings (regular)—80 lbs.
Chipped ice—50 lbs.
Curing salts (50% sodium nitrate, 50% sodium nitrite)—10 ozs.
Seasonings—20 ozs.

The beef, veal, ice, and seasonings are chopped to a temperature of 46° F. at which temperature the pork trimmings are added and the chopping continued to 56° F. At this point the curing salts and 15 ounces of the citric acid-containing pellets prepared as described above are added to the meat emulsion, and the emulsion is transferred to a Mince Master for further reduction in size and blending. The emulsion remains in the Mince Master long enough to allow the emulsion to move through it and is withdrawn at a temperature of 55° F. The emulsion is then stuffed into casings and smoked at a temperature of 160° F. for 2 hours. The smoked meat is then chilled to a temperature of 120° F. for 20 minutes and then at room temperature for 15 minutes. The meat is sliced and examined for color characteristics and compared with a control handled in a like manner, except that no citric acid-containing pellets are added. The product to which the pellets are added has a decidedly better color than the control. After storage for two days at a temperature of 45° F., samples of product to which the pellets are added are compared with samples of the control. The color of the samples from the product containing the citric acid pellets is still decidedly better than that of the control samples.

EXAMPLE 2

Using the mixer described in Example 1, 300 grams of gelatin are admixed with 100 grams of ascorbic acid and 200 grams of deionized water. A homogeneous mass is formed after several minutes. The rotating speed of the mixer is increased to the medium position and mixing is continued for one hour, during which time the mass is attrited and the water is slowly evaporated. Spheres of the wet mass begin to appear in the bowl. Mixing is continued for an additional 2 hours to allow for additional evaporation of water. The partially dried spheres are left in the mixer and 350 grams of a mixture comprising five parts ethyl cellulose ("Ethocel") and one part beeswax are admixed therewith. The rotating speed of the mixer is set at the medium position and mixing proceeds for one hour. The mass of spheres is dried for 10 hours to a moisture level of about 5%. The dry weight of the spheres consist of about 65 parts of gelatin, about 20 parts of the ethyl cellulose-beeswax mixture and about 15 parts ascorbic acid. The sphere size ranges between 30 and 40 mesh.

EXAMPLE 3

The procedure outlined in Example 1 is followed except that pellets containing tartaric acid, isoascorbic acid and adipic acid are used. The color of the meat samples to which the coated acid particles are added, in each case, has a decidedly better color than the control samples.

EXAMPLE 4

The procedure outlined in Example 2 is followed except that an equivalent number of grams of gum arabic and tartaric acid are used in place of the gelatin and the ascorbic acid. The final coating is then formed by admixing the partially dried spheres with 300 grams of stearic acid and heating and mixing at a temperature of approximately 69° C. The dried pellets comprise, by weight, 25% tartaric acid, 30% gum arabic and 45% stearic acid, and have a mesh size ranging from 35 to 45 mesh.

To a meat composition prepared as described in Example 1, 25 ounces of the tartaric acid containing pellets are added as before. Following processing of the meat composition, the finished meat product is sliced and examined for color characteristics and compared with a control. The product to which the pellets are added has a decidedly better color.

The improved results attained in accordance with the practice of the present invention advantageously can be enhanced or augmented, if desired, by the presence, in a free or uncoated or unencapsulated condition, in the meat emulsions of cured meat color promoters such as ascorbic acid, isoascorbic acid, or any of their water-soluble salts. The present invention further contemplates the optional use of vacuum mixing techniques and of nitric oxide and nitrogen dioxide as aids in developing and stabilizing the cured meat color.

The foregoing detailed description has been given for purposes of explanation only, and it is to be understood that various changes may be made in the details of the procedures outlined herein without departing from the spirit of the invention.

What is claimed is:

1. A composition having utility in the rapid development and stabilization of the cured color in comminuted meat products, comprising a solid, difficultly water-soluble, heat-rupturable body of a size not appreciably greater than the particulate material of a comminuted meat mass, said body consisting essentially of a substantially inert vehicle for carrying food-grade acid particles selected from the group consisting of citric acid, tartaric acid, ascorbic acid, isoascorbic acid, adipic acid, and mixtures thereof, the vehicle comprising an inner coating of an inert, water-soluble substance for initially entrapping the acid particles and an outer coating of an inert, water-insoluble, heat-rupturable substance for insulating the entrapped particles from the meat mass, the acid constituting from about 1% to about 25%, by weight, of said body and being released into said mass upon rupture by heat of the vehicle to effect a change in the pH of the meat mass and promote the rapid formation of the cured color in said mass and the stabilization of the color therein.

2. A composition as claimed in claim 1 wherein the inert, water-soluble substance comprises, by weight, from about 10% to about 70% of the total weight of the vehicle.

3. A composition according to claim 1 wherein the inner coating comprises gelatin, the outer coating comprises a mixture of ethyl cellulose and beeswax, and the acid is ascorbic acid.

4. A method of rapidly developing and stabilizing the cured color in comminuted meat products, comprising forming a comminuted meat mass, adding curing agents to said mass, incorporating small, solid substantially water-insoluble, heat-rupturable bodies into said mass, said bodies consisting essentially of an inert vehicle and a food-grade acid selected from the group consisting of citric acid, tartaric acid, ascorbic acid, isoascorbic acid, and adipic acid, and mixtures thereof, the acid constituting from about 1% to about 25%, by weight, of said bodies and being insulated from said meat mass by the vehicle, said vehicle comprising an inner coating of an inert, water-soluble substance in direct contact with the acid and an outer coating of an inert, water-insoluble, heat-rupturable substance, the quantity of said bodies incorporated in said mass being sufficient to release an amount of acid in the mass to effect a change in the pH of the mass to promote the rapid formation and stabilization of the cured meat color in the mass, and processing the meat mass and heating it to rupture said vehicle and to release the acid into the mass to effect rapid development of the cured color and the stabilization thereof in the mass.

5. A method according to claim 4 wherein the acid constitutes from 5% to about 20% of the solid, heat-rupturable body.

6. A method according to claim 4 wherein the quantity of said bodies added to the meat mass is sufficient to provide a concentration of the acid in the meat mass of from about 1% to about 5% for every 100 pounds of meat present.

7. A method according to claim 4 wherein the quantity of said bodies added to the meat mass is sufficient to provide a concentration of the acid in the meat mass of from about 2% to about 4% for every 100 pounds of meat present.

8. A method according to claim 4 wherein the inner coating comprises from about 20% to about 40%, by weight, of the total weight of the vehicle.

9. A method according to claim 4 wherein the inner coating is gelatin, the outer coating is ethyl cellulose, and the acid is citric acid.

References Cited

UNITED STATES PATENTS

| | | | |
|---|---|---|---|
| 2,410,417 | 11/1946 | Andersen | 99—11X |
| 3,131,068 | 4/1964 | Greif et al. | 99—109UX |
| 3,145,111 | 8/1964 | Norton | 99—166X |
| 3,359,120 | 12/1967 | Meusel et al. | 99—109 |

FOREIGN PATENTS

| | | | |
|---|---|---|---|
| 516,513 | 1/1940 | Great Britain | 99—11 |

HYMAN LORD, Primary Examiner

U.S. Cl. X.R.

99—109, 159, 222